(12) United States Patent
Murase

(10) Patent No.: US 9,862,158 B2
(45) Date of Patent: Jan. 9, 2018

(54) TIRE MANUFACTURING METHOD

(75) Inventor: Shinji Murase, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/982,282

(22) PCT Filed: Jan. 30, 2012

(86) PCT No.: PCT/JP2012/051964

§ 371 (c)(1),
(2), (4) Date: Sep. 10, 2013

(87) PCT Pub. No.: WO2012/108286

PCT Pub. Date: Aug. 16, 2012

(65) Prior Publication Data

US 2014/0020813 A1    Jan. 23, 2014

(30) Foreign Application Priority Data

Feb. 8, 2011    (JP) .................................. 2011-024719

(51) Int. Cl.
*B29D 30/56*    (2006.01)
*B29D 30/00*    (2006.01)
(Continued)

(52) U.S. Cl.
CPC ..... *B29D 30/0061* (2013.01); *B29D 30/1607* (2013.01); *B29D 30/54* (2013.01);
(Continued)

(58) Field of Classification Search
CPC .. B29D 30/54; B29D 30/56; B29D 2030/544; B29D 2030/546
See application file for complete search history.

(56) References Cited

U.S. PATENT DOCUMENTS 4,088,527 A * 5/1978 Murase ................... B29C 65/00
156/157
4,231,836 A * 11/1980 Ljungqvist .............. B29C 65/00
156/157
(Continued)

FOREIGN PATENT DOCUMENTS

EP          1946914 A1       7/2008
JP          A-56-117637      9/1981
(Continued)

OTHER PUBLICATIONS

Machine generated English language translation of JP 2008-290659 (original document dated Dec. 2008).*

(Continued)

*Primary Examiner* — Martin Rogers
(74) *Attorney, Agent, or Firm* — Oliff PLC

(57) ABSTRACT

A tire manufacturing method to obtain a base tire superior in uniformity when the base tire has a cushion gum applied thereon. In this process of tire manufacture, the thickness from a belt, which is located in the outermost layer of the base tire having an application surface for the cushion gum, to the application surface is measured along the circumference of the base tire so as to detect a maximum thickness position. Then the circumferential winding of the cushion gum extruded from an extrusion molding unit is started from the maximum thickness position.

6 Claims, 2 Drawing Sheets

(51) Int. Cl.
  *B29D 30/54*    (2006.01)
  *B29D 30/16*    (2006.01)
  *B29D 30/30*    (2006.01)

(52) U.S. Cl.
  CPC ...... *B29D 30/56* (2013.01); *B29D 2030/3078* (2013.01); *B29D 2030/544* (2013.01); *B29D 2030/546* (2013.01)

(56) References Cited

U.S. PATENT DOCUMENTS

| | | | | |
|---|---|---|---|---|
| 5,458,727 | A * | 10/1995 | Meyer | B29C 47/0019 156/405.1 |
| 5,635,015 | A * | 6/1997 | Longo | B29D 30/28 156/322 |
| 5,679,205 | A * | 10/1997 | Marks | B26D 1/0006 156/134 |
| 6,280,556 | B1 * | 8/2001 | Okada | B29D 30/42 156/264 |
| 2005/0279443 | A1 * | 12/2005 | Chapman et al. | 156/96 |
| 2009/0294002 | A1 * | 12/2009 | Tanaka | 152/209.6 |

FOREIGN PATENT DOCUMENTS

| | | | |
|---|---|---|---|
| JP | A-2006-508838 | 3/2006 | |
| JP | 2008-290659 | * 12/2006 | ............ B60C 9/04 |
| JP | 2007-62041 | * 3/2007 | ............ B29D 30/30 |
| JP | 2007-62248 | * 3/2007 | ............ B29D 30/54 |
| JP | A-2007-62248 | 3/2007 | |
| JP | A-2009-6583 | 1/2009 | |
| WO | 2004/052633 A1 | 6/2004 | |
| WO | 2009/041980 A1 | 4/2009 | |
| WO | 2009/123610 A1 | 10/2009 | |

OTHER PUBLICATIONS

Machine generated English lanuage translation of JP 2007-62248 (original document dated Mar. 2007).*
Machine generated English language translation of JP 2007-62041 (original document dated Mar. 2007).*
International Search Report issued in International Patent Application No. PCT/JP2012/051964 dated Apr. 17, 2012.
Written Opinion of the International Searching Authority issued in International Patent Application No. PCT/JP2012/051964 dated Apr. 17, 2012.
Jan. 18, 2016 Extended European Search Report issued in European Patent Application No. 12744699.5.

* cited by examiner

VARIATIONS IN RUBBER THICKNESS D

PHASE ANGLE θ [°]

VARIATIONS IN THE TOTAL OF RUBBER THICKNESS D AND CUSHION GUM 11 THICKNESS

PHASE ANGLE θ [°]

TIRE MANUFACTURING METHOD

TECHNICAL FIELD

The present invention relates to a tire manufacturing method and, more particularly, to a tire manufacturing method in which a cushion gum is optimally applied between a tread and a base tire when the separately fabricated tread and base tire are integrated together.

BACKGROUND ART

In a known tire manufacturing method, the tread of a tire and a base tire which provides the base for the tire are fabricated separately. Then an uncured cushion gum is applied to the peripheral surface of the base tire before the tread is applied to the top surface of the cushion gum. And finally the cushion gum is cured, thereby bonding the tread and the base tire together with the cushion gum in between them.

An application surface of a base tire to which a new tread is applied is formed, for instance, by removing the worn tread portion of a used tire with a buffing machine. The base tire formed with the application surface is then subjected to a measurement of the thickness from the steel belt of the base tire to the application surface (hereinafter referred to as "gauge thickness") along its circumference, and the thinnest thickness is detected from the measurement results as the position of the lightweight point of the base tire. The cushion gum which is wound around the application surface is extrusion-molded by an extrusion molding machine into a predetermined length, which is the circumferential length of a single tire, and a predetermined width. The cushion gum thus extrusion-molded is conveyed by a conveyance means, such as a conveyor, to the position of application to the base tire, and the cushion gum is wound circumferentially with its lead edge at the position of the lightweight point. That is, as the cushion gum is wound around the application surface of the base tire with its joint aligned with the position of the lightweight point, the total of the gauge thickness of the base tire and the thickness of the cushion gum will be approximately even. Thus, when the tread is applied on the cushion gum, a tire superior in uniformity is manufactured.

However, the lead edge of the cushion gum extruded from the extrusion molding machine tends to be thinner than the other part midway through the winding around the application surface because of the smaller amount of extrusion due to the lower temperature of the cushion gum. Also, at the end of winding, where the amount of extrusion is controlled to become small, the tail edge of the cushion gum tends to be thinner than the part midway through the winding. In other words, the alignment of the joint of the cushion gum with the lightweight point of the base tire where the gauge thickness is the thinnest can produce the thinnest point of the base tire around which the cushion gum is wound, thus impairing the uniformity of the tire.

PRIOR ART DOCUMENT

Patent Document

Patent Document 1: Japanese Unexamined Patent Application Publication No. 2007-62248

SUMMARY OF THE INVENTION

Problem to be Solved by the Invention

The present invention has been made to solve the above-described problems, and an object thereof is to provide a tire manufacturing method that enables the production of a base tire superior in uniformity by applying a cushion gum to the base tire.

Means for Solving the Problem

In a method that solves the above-described problems, the thickness from the belt located in the outermost layer of a base tire, which has an application surface for cushion gum, to the application surface is measured along the circumference of the base tire and the maximum thickness position is detected. Then the winding of cushion gum extruded from an extrusion molding unit around the circumference of the base tire is started from the maximum thickness position. According to this method, the joint portion where the lead edge of a cushion gum extruded from the extrusion molding unit with a thickness thinner than that during the winding of the cushion gum is joined with the tail edge of the cushion gum which is the end of extrusion with a thinner thickness is aligned with the maximum thickness position of thickness between the belt and the application surface. Therefore, the base tire to which the cushion gum is applied by the present method exhibits superior uniformity with uniform total thickness of the base tire and the cushion gum.

Also, in another method of the present invention, the thickness from the belt located in the outermost layer to the application surface is measured with a non-contact sensor. According to this method, the thickness from the belt located in the outermost layer to the application surface can be measured without causing any damage to the application surface.

Also, in still another method, the non-contact sensor is an eddy current displacement sensor. According to this method, the eddy current displacement sensor can detect the steel belt constituting apart of the base tire, and therefore the thickness from the steel belt to the application surface can be measured without causing any damage to the application surface.

Also, in still another method, there is an additional step of marking the maximum thickness position. According to this method, the maximum thickness position can be visually recognized, so that it is possible to grasp the winding start position of cushion gum accurately. Especially if the marking is provided on a side area of the base tire, the winding start position of cushion gum can be confirmed even after the completed manufacture of a tire with the tread applied.

Hereinafter, the invention will be described based on preferred embodiments which do not intend to limit the scope of the claims of the present invention but exemplify the invention. All of the features and the combinations thereof described in the embodiments are not necessarily essential to the invention, and they include constructions and arrangements to be employed selectively.

BEST MODE FOR CARRYING OUT THE INVENTION

Figure 1:
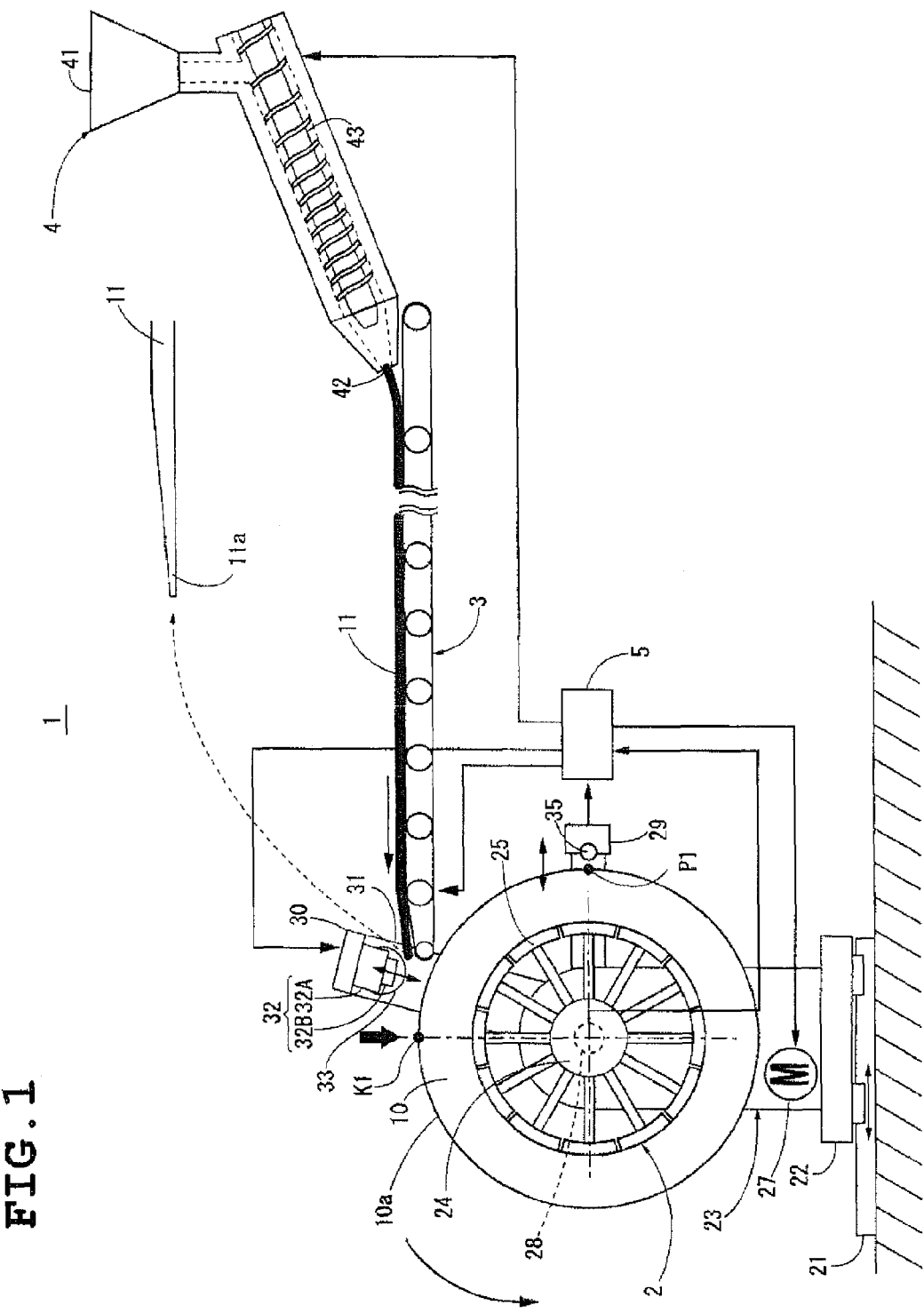
FIG. 1 is a schematic configuration diagram of a cushion gum application machine.
Figure 2:
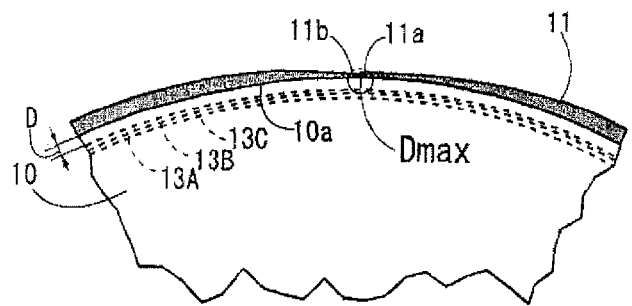
FIG. 2 is a partially enlarged view of a joint portion of a cushion gum applied to the application surface of a base tire.

FIG. 1 is a schematic configuration diagram of a cushion gum application machine 1 which applies a cushion gum 11 to an application surface 10a of a base tire 10. FIG. 2 is a partially enlarged view of the cushion gum 11 wound around the application surface 10a of the base tire 10.

Hereinbelow, preferred embodiments of the present invention are explained referring to drawings. The cushion gum application machine 1 includes a base tire holding unit 2, a conveyance unit 3, an extrusion molding unit 4 of cushion gum 11, and a control unit 5.

The base tire 10 to be held by the base tire holding unit 2 is a used tire whose tread portion has been removed by buffing with a not-shown buffing machine such that the peripheral surface of the tire is formed in a predetermined shape.

The base tire holding unit 2 includes a pair of rails 21, a base 22 that moves to and fro on the rails 21, a unit body 23 installed upright on the base 22, a rotating shaft 24 that extends horizontally from one side of the unit body 23 and is rotated by the output of a motor, a rim assembly 25 that is attached to one end side of the rotating shaft 24 and holds the base tire 10, an encoder 28 that is attached to the other end side of the rotating shaft 24 and measures the rotation angle of the rotating shaft 24, a non-contact type eddy current displacement sensor 29 that measures the thickness of the base tire 10 held by the rim assembly 25 from the application surface 10a formed on the periphery of the base tire 10 to the belt, and a stitcher 30 that presses and levels the cushion gum 11 on the application surface 10a of the base tire 10.

The rim assembly 25 is comprised of a plurality of fan-shaped rim pieces which divide a cylindrical wheel radially such that they can accommodate tires of different sizes. The rim assembly 25 is therefore provided with a not-shown expansion/contraction mechanism that can move the rim pieces radially. Covering the outer periphery of the rim assembly 25 formed of the plurality of rim pieces is a not-shown cylindrical sealing member, which supports the bead portions of the base tire 10 as the rim pieces are moved radially outward. With the sealing member in contact with the bead portions of the base tire 10, the interior space of the base tire 10 is sealed by the sealing member. Thus, as the interior space is filled with air, the base tire 10 can be held unmovably to the rim assembly 23 while keeping its internal pressure. Attached to the other end side of the rotating shaft 24 is the encoder 28 which measures the rotation angle of the rotating shaft 24.

The encoder 28, which is coupled to the control unit 5, measures the phase angle θ from the start of rotation of the rotating shaft 24 and outputs the rotation angle signal to the control unit 5.

The motor 27, which is coupled to the control unit 5, causes the rotation of the rotating shaft 24 according to the rotation signal outputted from the control unit 5.

The stitcher 30 is secured to a side surface of the unit body 23 opposite from the side of the unit body 23 where the rotating shaft 24 projects. The stitcher 30 has an arm 31, which is constituted by a support member extending above the outer periphery of the base tire 10 and a horizontal support member extending in parallel with the rotating shaft 24 from the upper end of the support member, and a pressing mechanism 32 held movably along the horizontal support member. The pressing mechanism 32 includes a cylinder 32A which is extensible and retractable and a roller 33 which is rotatably supported at an end of a piston 323 in the cylinder 32A. The cylinder 32A has, for instance, a not-shown servo motor as a drive source such that the piston 323 extends and retracts in response to the extension/retraction signal inputted to the servo motor from the control unit 5.

The roller 33, which is a cylindrical body supported on a shaft at an end portion of the piston 32B, is a member for pressing and leveling the cushion gum 11 wound around the application surface 10a of the base tire 10. The roller 33 causes the cushion gum 11 to closely fit the outer periphery of the base tire 10 by pressing the sheet-like cushion gum 11 wrapped full circle about the application surface 10a of the base tire 10 against the application surface 10a of the base tire 1.

The eddy current displacement sensor 29 is of such construction that it can be brought into contact with and separated from the application surface 10a of the base tire 10. The eddy current displacement sensor 29 is provided with a pair of wheels 35, which can be brought into contact with the application surface 10a of the base tire 10. Thus, the eddy current displacement sensor 29 can measure the rubber thickness D from a steel belt 13C, located in the outermost layer of the plurality of steel belts 13A to 13C of the base tire 10, to the application surface 10a, while maintaining a fixed distance of itself relative to the application surface 10a of the base tire 10.

More specifically, the eddy current displacement sensor 29 causes an eddy current in a conductive body by bringing a built-in coil closer to the conductive body while passing an alternating current in the coil. And the eddy current displacement sensor 29 detects the distance from the steel belt 130 to the application surface 10a by measuring the change in impedance caused in the coil by the AC magnetic field generated by the eddy current. That is, the change in impedance is measured when an eddy current is produced in the steel belt 13C closest to the eddy current displacement sensor 29 (steel belt 13C located in the outermost position in the radial direction of the tire) of the steel belts in the belt layer of the base tire 10, and the voltage representing the distance from the steel belt 13C to the eddy current displacement sensor 29 is outputted as the rubber thickness D.

A conveyance unit 3 which conveys the cushion gum 11 is disposed in a direction of extension of the application surface 10a of the base tire 10 held by the rim assembly 25.

The conveyance unit 3 may be a roller conveyor, for instance. The conveyance unit 3 conveys cushion gum 11 in strips having been extrusion-molded by an extrusion molding unit 4 to be described later to a predetermined position in relation to the application surface 10a of the base tire 10. At the same time, the conveyance unit 3 enables the winding of the cushion gum 11 circumferentially around the application surface 10a of the base tire 10 by controlling the conveyance speed of the cushion gum 11 to the application surface 10a of the base tire 10 in correspondence to the rotation speed of the base tire 10.

The extrusion molding unit 4 of cushion gum 11 is disposed in a position upstream of the conveyance unit 3. The extrusion molding unit 4 includes a hopper 41 into which the material of the cushion gum 11 is introduced, a screw 43 which kneads the material introduced through the hopper 41 by turning and carrying it toward the exit, and an extrusion outlet 42 which molds the cushion gum 11 kneaded by the screw 43 into a predetermined cross-sectional shape. The extrusion of cushion gum 11 is performed for each base tire 10 around which the cushion gum 11 is wound. Accordingly, the extrusion molding unit 4 of cushion gum 11 is operated in response to the molding signal outputted from the control unit 5. The cushion gum 11 extruded from the extrusion outlet 42 is molded into a strip of a fixed width having a rectangular cross section, and the amount of extrusion for a single operation is so set as to nearly equal a full circle around the base tire. That is, the cushion gum 11 is molded into a width corresponding to the tread width of the base tire 10 and is cut into a fixed length corresponding to the outer perimeter of the base tire.

The control unit 5 stores the voltage representing the distance from the steel belt to the eddy current displacement sensor 29, which is measured circumferentially along the application surface 10a of the base tire 10, as the rubber thickness D. And the control unit 5 detects the maximum thickness position D max and the phase angle θ of the position where the thickness from the steel belt 13C to the eddy current displacement sensor 29 is the greatest of the rubber thickness D which varies circumferentially. Then the control unit 5 outputs a rotation signal to a motor 27 so that the maximum thickness position D max comes to the winding start position K for the cushion gum 11.

A description will now be given of a method for manufacturing a retreaded tire using a cushion gum application machine 1 having a structure as described above.

First, at a stage prior to the application of cushion gum 11 by the cushion gum application machine 1, the application surface 10a of a base tire 10 is formed into a predetermined shape by, for instance, removing the tread portion of a used tire with a not-shown buffing machine.

Next, the base tire 10 is removed from the buffing machine and mounted on the rim assembly 25 of the base tire holding unit 2.

Then, using the following procedure, a focus point of the base tire 10 is detected by rotating the rim assembly 25. First of all, the wheel 35 of the eddy current displacement sensor 29 is brought into contact with the application surface 10a of the base tire 10 in such a manner that the measuring position of the eddy current displacement sensor 29 is aligned with the axial (width) center of the tire. Next, an AC current is applied to the eddy current displacement sensor 29, and at the same time a rotation signal is outputted to the motor 27, thereby causing the rotation of the rotating shaft 24 and the base tire 10. The AC current flowing through the coil of the eddy current displacement sensor 29 causes an eddy current in the steel belt 13C located in the radially outermost position of the tire. And the eddy current causes a back electromotive force to work on the coil of the eddy current displacement sensor 29, which causes a change in voltage as detected by the eddy current displacement sensor 29. That is, the distance from the steel belt 13C to the eddy current displacement sensor 29 is measured as changes in voltage along with the changes in the phase angle θ of the base tire 10, which are outputted to the control unit 5. The changes in voltage inputted to the control unit 5 are measured as changes in the rubber thickness D. The changes in voltage for a full circle of the base tire 10 as detected by the eddy current displacement sensor 29 are stored in the control unit 5. Then the control unit 5 detects the maximum thickness position D max of the rubber thickness D and the phase angle θ therefor from the stored changes in voltage and stores them as the focus point of the base tire 10. Note that as the phase angle θ, the measuring start position P1 of the rubber thickness D is set as the reference position 0° and the angle signals from 0° to 360° outputted from the encoder 28 are stored in association with the rubber thickness D.

Also, a marking indicating the maximum thickness position D max is, for instance, stamped by a not-shown marking unit at the focus point on a side of the base tire 10. Accordingly, the maximum thickness position of the application surface 10a of the base tire 10 can be visually checked from outside also.

Next, the control unit 5 controls the rotation of the base tire 10 so that the maximum thickness position D max is located at the winding start position K1 of the cushion gum 11. More specifically, the rotating shaft 24 is rotated so that the maximum thickness position D max is located at the topmost position.

Then the control unit 5 outputs an extrusion start signal of cushion gum 11 to the extrusion molding unit 4 of cushion gum 11, thereby starting an extrusion molding of the cushion gum 11 into a circumferential length equivalent to a full circle of the outer periphery of the base tire. The cushion gum 11 extruded from the extrusion molding unit 4 is discharged onto the conveyance unit 3. Also, the conveyance speed is controlled in correspondence to the extrusion speed of the screw 43 such that no tension acts on the extruded cushion gum 11.

The cushion gum 11 molded into a length equal to a full circle of a tire is conveyed by the conveyance unit 3 as far as the winding start position K1 facing the application surface 10a of the base tire 10. The winding start edge (lead edge) 11a of the cushion gum 11 having been conveyed to the winding start position K1 is aligned with the maximum thickness position D max of the rubber thickness D of the base tire 10, and the winding of the cushion gum 11 is started. More specifically, the rotation of the rim assembly 25 holding the base tire 10 is started as the lead edge 11a of the cushion gum 11 is aligned with the maximum thickness position D max of the base tire 10. Then the circumferential speed at which the application surface 10a of the base tire 10 rotates and the conveyance speed of the conveyance unit 3 are controlled by the control unit 5 so that they are in agreement with each other. And when the winding of the cushion gum 11 as far as the winding end edge (tail edge) is completed, the lead edge 11a and the tail edge 11b of the cushion gum 11 are joined with each other in a butted state at the winding start position K1 as shown in FIG. 2.

The arrangement as described above is employed because, if the speed of conveyance of cushion gum 11 by the conveyance unit 3 is slower than the circumferential speed of the rotation of the application surface 10a of the base tire 10, the cushion gum 11 can get elongated by the action of tension caused by the rotation of the base tire 10. On the other hand, if the speed of conveyance of cushion gum 11 by the conveyance unit 3 is faster than the circumferential speed of the rotation of the application surface 10a of the base tire 10, then the cushion gum 11 will be forcibly conveyed to the winding start position K. As a result, more than necessary cushion gum 11 will be supplied to the application surface 10a of the base tire 10 such that a uniform winding will no longer be accomplished.

Next, the control unit 5 outputs a leveling signal to the stitcher 30, by which the roller 33 is brought into contact with the cushion gum 11 and then base tire 10 is rotated, thus having the cushion gum 11 pressed and leveled over the application surface 10a. The pressed cushion gum 11 is applied evenly on the application surface 10a with the lead edge 11a and the tail edge 11b, which form the joint of the cushion gum 11, adhering tightly to each other.

Through the processes as described above, the winding of the cushion gum 11 around the application surface 10a of the base tire 10 is completed.

Next, a precured tread is conveyed on the conveyance unit 3 from upstream of the extrusion molding unit 4 of cushion gum 11 and applied to the outer periphery of the base tire 10 which has already the cushion gum 11 applied thereon.

After this, the base tire with the tread applied thereto is subjected to the curing of the cushion gum by a not-shown curing machine with the entire peripheral surface thereof covered with an envelope, for instance. In this manner, a finished tire is manufactured.

Therefore, by controlling the timing of winding of the cushion gum 11 around the application surface 10a of the base tire 10, the application of the cushion gum 1 can be accomplished with the joint position of the cushion gum 1, which is the joint position of the winding start edge 11a and the winding end edge 11b, aligned with the maximum thickness position D max of the base tire 10.

As described above, when the cushion gum 11 molded by the extrusion molding unit 4 is applied to the base tire 10, the lead edge 11a and the tail edge 11b of the cushion gum 11 are joined with each other at the maximum thickness position D max of rubber thickness D of the base tire 10. As a result, the total thickness of the thickness of the cushion gum 11 and the rubber thickness D will be uniform circumferentially. This will ensure a uniform weight balance of the tire radially outside of the steel belt 13C and thus a reduced imbalance of the tire when it is rotated. Thus, it is possible to manufacture a tire featuring reduced vibrations during the travel of a vehicle.

Experimental Example

Figure 3A:
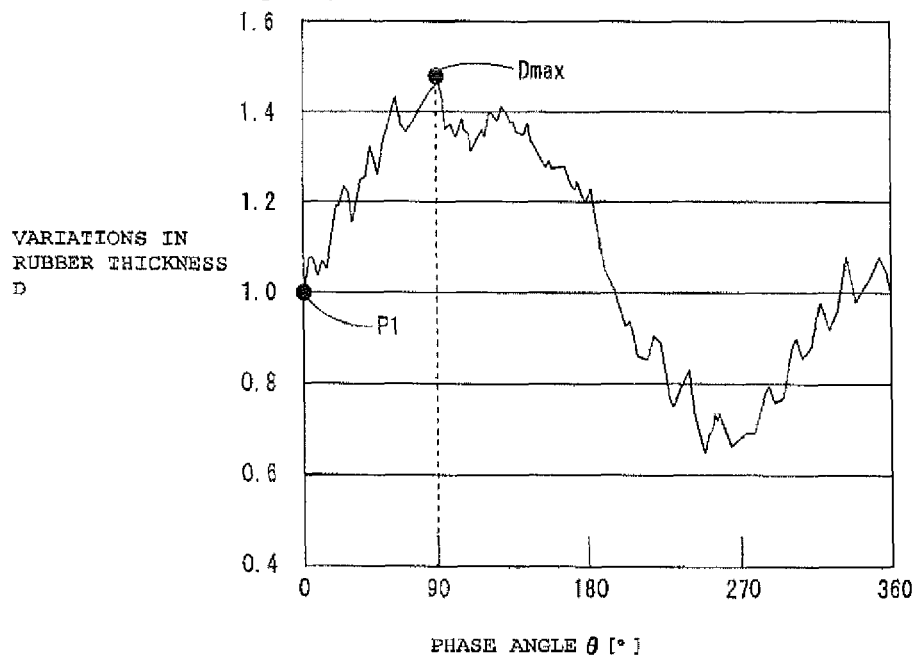
FIG. 3 is a distribution chart of rubber thickness along the circumference of a base tire after buffing and a distribution chart of the thickness of cushion gum applied to the base tire.
Figure 3B:
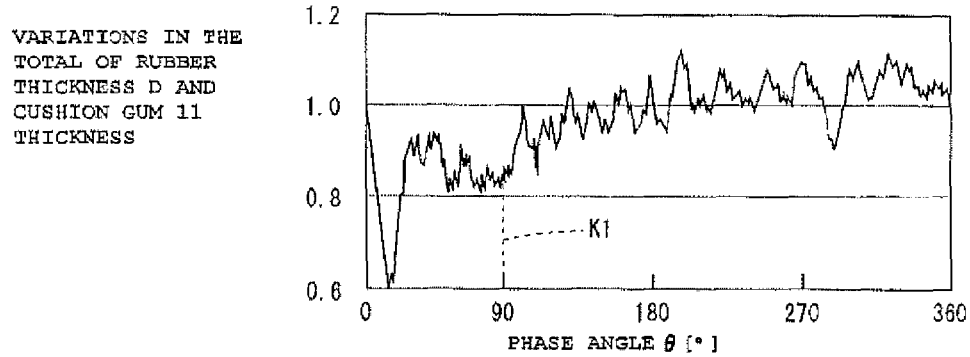

FIG. 3A shows a distribution of rubber thickness D along the circumference of a base tire 10 after buffing. FIG. 3B shows a distribution of the thickness of cushion gum 11 in a circumferential length equaling a full circle of a base tire 10.

In FIG. 3A, the horizontal axis represents the phase angle θ, and the vertical axis the variations (dimensionless) of the rubber thickness D relative to the measuring start position P1 as reference. As is evident in FIG. 3A, the rubber thickness D of the base tire 10 after buffing changes in a cyclic manner along the circumference thereof. As a result of winding of the cushion gum 11 around the application surface 10a by aligning the lead edge 11a of the cushion gum 11 extruded from the extrusion molding unit 4 with the maximum thickness position D max of rubber thickness D in the application surface 10a of the base tire 10, the variations along the circumference of the total thickness of cushion gum 11 and rubber thickness D are as shown in FIG. 3B.

That is, it is shown that at the phase angle 90° from the measuring start position P1, which coincides with the maximum thickness position D max of the rubber thickness D, the total thickness of the rubber thickness D and the cushion gum 11 wound around the base tire is slightly thinner than that of the other parts and the amplitude of variations for a full circle of the tire is smaller than the amplitude of variations of the rubber thickness D. In other words, the result indicates a superior circumferential weight balance.

In the foregoing embodiments, the winding of the cushion gum 11 has been described such that the butting of the ends of the cushion gum 11 is at the maximum thickness position D max. However, the winding may be performed such that the lead edge 11a and the tail edge 11b of the cushion gum 11 overlap each other at the maximum thickness position D max.

Also, it has been described that the cushion gum 11 is conveyed by the conveyance unit 3 to the application surface 10a of the base tire 10 after it is cut into a length corresponding to the outer perimeter of the base tire 10. However, the winding of the cushion gum 11 around the application surface 10a of the base tire 10 may be performed while the cushion gum 11 is being extruded from the extrusion molding unit 4.

Also, it has been described that the cushion gum application machine 1 is provided with an eddy current displacement sensor 29 and the maximum thickness position ID max of the rubber thickness D is detected after the base tire 10 is mounted on the rim assembly 25. However, the arrangement may be such that the buffing machine for buffing a used tire is provided with the eddy current displacement sensor 29 and the measurement is taken of the thickness from the steel belt 130 to the application surface 10a and the maximum thickness position D max is marked on the side of the base tire after it is detected.

It has also been described that the rubber thickness D from the steel belt 13C, which is located in the outermost layer, of the steel belts 13A to 13C to the application surface 10a is measured. However, if anyone of the steel belt structure within the base tire 10 is the intended target in the measurement with the eddy current displacement sensor 29, then it is possible to detect the rubber thickness D from the target steel belt to the application surface 10a. Therefore, in this way, too, the cushion gum 11 can be wound around the base tire as described above to manufacture a tire superior in uniformity.

Where no steel belt is used in the tire, the thickness from the belt located in the outermost layer of a plurality of belts to the application surface 10a may be measured with another type of non-contact sensor. In this case, the position for thickness measurement are not limited to that from the belt located in the outermost layer to the application surface 10a, but the thickness from the inner surface of the base tire 10 to the application surface 10a may be measured along the circumference of the base tire 10.

Also, it has been described that the application surface 10a of the base tire 10 is formed by removing the tread portion of a used tire. However, a new base tire without tread rubber may also be used to gain the same result as in the foregoing embodiments.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

DESCRIPTION OF REFERENCE NUMERALS 1 cushion gum application machine
2 base tire holding unit
3 conveyance unit
4 extrusion molding unit
5 control unit
10 base tire
10a application surface
11 cushion gum
11a winding start edge (lead edge)
11b winding end edge (tail edge)
21 rails
22 base
23 unit body
24 rotating shaft
25 rim assembly
28 encoder
29 eddy current displacement sensor
30 stitcher 31 arm
32 pressing mechanism
32A cylinder
32B piston
33 roller
35 wheel
41 hopper
42 extrusion outlet
43 screw
D rubber thickness
D max maximum thickness position
K1 winding start position
P1 measuring start position

The invention claimed is:

1. A tire manufacturing method comprising the steps of:
measuring a thickness from a belt, which is located in an outermost layer of a base tire having an application surface for a cushion gum, to the application surface around a circumference of the base tire and detecting a maximum thickness position; and
winding the cushion gum, which is extruded from an extrusion molding unit, around the circumference of the base tire starting from the maximum thickness position in such a manner that a circumferential speed at which the application surface of the base tire rotates and a conveyance speed of a conveyance unit are controlled by a control unit so that the circumferential speed and the conveyance speed are in agreement with each other, and in such a manner that a lead edge and a trail edge of the cushion gum are joined with each other in a butted state at the winding start position; wherein
a thickness of the lead edge and a thickness of the trail edge of the cushion gum that winds around the circumference of the base tire are both thinner than a thickness of any inner part of the cushion gum that is between the lead edge and the trail edge of the cushion gum before the lead edge and the trail edge are provided in the butted state, and there is no thickness overlap of the cushion gum where the lead edge and the trail edge of the cushion gum are joined with each other in the butted state.

2. The tire manufacturing method according to claim 1, wherein the thickness from the belt located in the outermost layer to the application surface is measured with a non-contact sensor.

3. The tire manufacturing method according to claim 2, wherein the non-contact sensor is an eddy current displacement sensor.

4. The tire manufacturing method according to claim 1, further comprising a step of marking the maximum thickness position.

5. The tire manufacturing method according to claim 2, further comprising a step of marking the maximum thickness position.

6. The tire manufacturing method according to claim 3, further comprising a step of marking the maximum thickness position.

* * * * *